April 6, 1965      L. M. FARLEY      3,176,903
TWO-WHEELED VEHICLE CARRIER
Filed Dec. 23, 1963
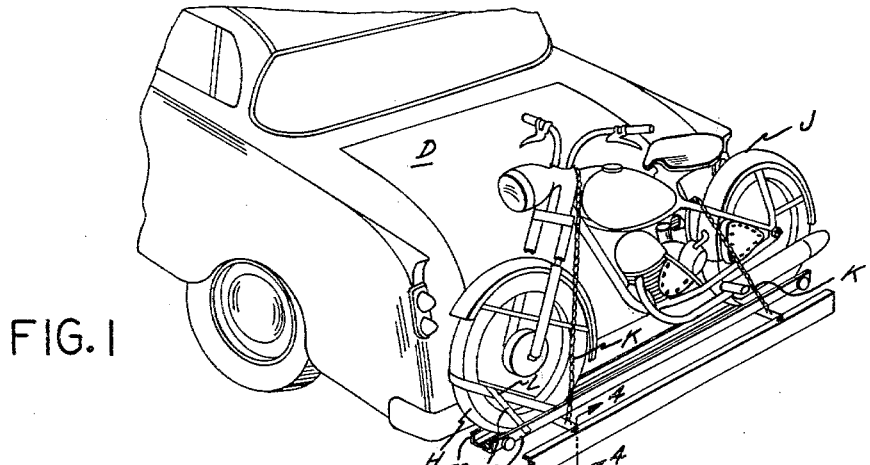
FIG. 1
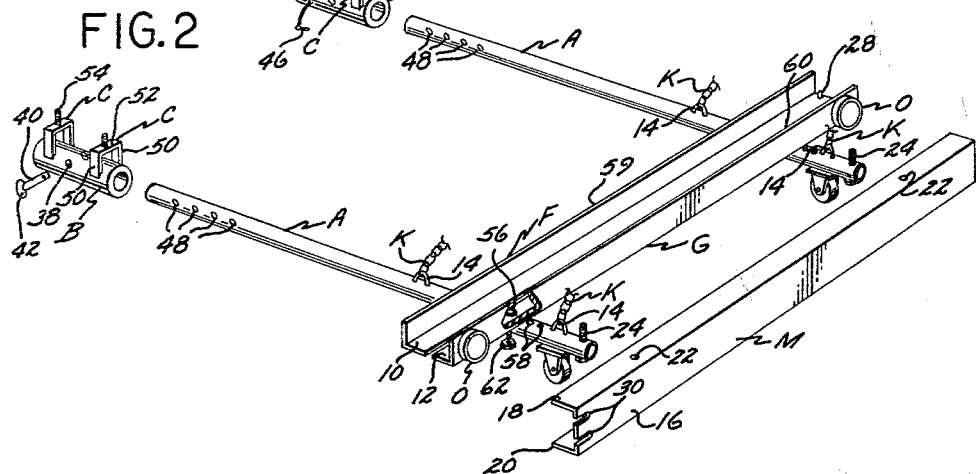
FIG. 2
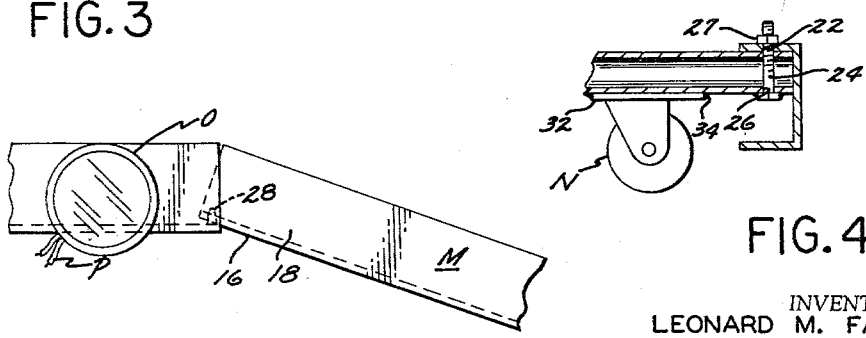
FIG. 3
FIG. 4
INVENTOR.
LEONARD M. FARLEY
BY
William C. Babcock
ATTORNEY 3,176,903
TWO-WHEELED VEHICLE CARRIER
Leonard M. Farley, Cypress, Calif.
(14715 S. Vermont, Gardena, Calif.)
Filed Dec. 23, 1963, Ser. No. 332,668
5 Claims. (Cl. 224—42.03)

The present invention relates generally to the field of carriers, and more particularly to a carrier that may be removably affixed to the rear of an automotive vehicle, and is particularly adapted for transporting motorcycles or other two-wheeled vehicles thereon.

During recent years, the use of motorcycles, scooters, and the like has appreciably increased, particularly as a means of transportation by hunters, other sportsmen, hobbyists, and the like, in traversing rough and isolated areas. Although a motorcycle provides an ideal vehicle for such travel, yet as a vehicle for use on long trips it is tiring and somewhat hazardous to use on crowded highways.

A primary object in devising the present invention is to provide a carrier for two-wheeled vehicles which may be removably mounted on the rear of an automotive vehicle, and one of such structure that a two-wheeled vehicle may be quickly and easily mounted thereon or removed therefrom.

Another object of the invention is to provide a carrier for two-wheeled vehicles that includes a bumper which not only serves as such, but when removed from the carrier can be so disposed relative thereto as to serve as a ramp on which a motorcycle, scooter, or the like, may be wheeled to place it on the carrier or to wheel it therefrom onto the ground surface.

Yet another object of the invention is to supply a carrier for two-wheeled vehicles that can be adjustably mounted on the rear of an automotive vehicle, can be easily installed on or removed therefrom, and one that includes means by which it can be conveniently wheeled to a storage area when not in use.

Still another object of the invention is to furnish a carrier for two-wheeled vehicles that automatically supports the same in an upright position after placement thereon, prior to being firmly secured to the carrier.

A further object of the invention is to provide a carrier for two-wheeled vehicles that not only includes a bumper for the protection thereof, but tail lights as well for warning to following motorists of the rearwardly projecting load borne by the automotive vehicle.

These and other objects and advantages of the invention will become apparent from the following description of a preferred form thereof, and from the accompanying drawing illustrating that form in which:

FIGURE 1 is a perspective view of the rear of an automotive vehicle showing the loaded carrier mounted thereon;

FIGURE 2 is an exploded perspective view of the carrier;

FIGURE 3 is a fragmentary rear elevational view of the carrier showing the bumper disposed in a position to serve as a ramp by which a motorcycle or the like may be wheeled onto or off the carrier; and FIGURE 4 is a vertical cross-sectional view of a portion of the carrier, taken on the line 4—4 of FIGURE 1.

With continuing reference to the drawing for the general arrangement of the invention, it will be seen in FIGURE 2 to include two elongate, parallel rigid members A. The diameter of the forward end portions of members A is such as to permit them to be slidably inserted in two cylindrical shells B. One or more brackets C are affixed to shells B which may be bolted or otherwise secured to the chassis (not shown) of an automotive vehicle D.

First and second transversely positioned angle irons F and G, respectively, rest on the rear portions of members A and are secured thereto by means to be later described. The angle irons F and G are spaced sufficiently far apart as to accommodate the pneumatic-tired wheels H of a motorcycle J, which wheels rest on horizontal flanges 10 and 12 integrally formed on angle irons F and G, respectively, as shown in FIGURES 1 and 2.

Two flexible chains, or other fastening means K, extend upwardly from two eyes 14 provided on each of the members A. Chains K pass over the forward and rear portions of the motorcycle J to firmly maintain it in position on the angle irons F and G. A yoke L extends upwardly and outwardly from first end portions of the angle irons F and G, and serves to removably yet firmly engage the lower part of the front wheel H to hold the motorcycle K in an upright position on the angle irons before it is securely bound by the chains K, as shown in FIGURE 1.

The carrier also includes a bumper M (FIGURES 2 and 4) comprising an elongate vertical web 16 and two flanges 18 and 20 that extend forwardly from the longitudinal edges thereof. Two bores 22 are formed in flange 18, as may best be seen in FIGURE 2. Two bolts 24 extend upwardly through bores 26 formed in the rear extremities of members A, and the heads of these bolts are welded to members A, as illustrated in FIGURE 4. The upwardly extending portions of the bolts 24 are adapted to pass through the openings 22 in bumper M to removably support the bumper in the position shown in FIGURE 1 on the carrier. Those portions of the bolts 24 extending upwardly through the bores 22 are engaged by nuts 27 to prevent inadvertent displacement of the bumper M from the members A.

Prongs 28 project upwardly from the second end portions of flanges 10 and 12 (FIGURES 2 and 3). Two recesses 30 are formed in the first end portion of web 16 and are so spaced as to removably engage the prongs 28 when the first end portion of the bumper M rests on the second ends of the flanges 10 and 12. The second end portion of the bumper M rests on the ground surface (not shown) to serve as a ramp on which the motorcycle J may be wheeled to place it in a supported position on the angle irons F and G (FIGURE 1), or to be wheeled downwardly therefrom.

A caster N is affixed to the lower rear portion of each member A by conventional means, such as welding the supporting plate 32 of the caster at locations 34 to the end of one of the members. Two electrically operated tail lights O are preferably supported from the rear vertical portion of angle iron G (FIGURE 2), and these tail lights serve to warn following motorists that a motorcycle J is supported on the rear of the vehicle D and projects rearwardly therefrom. The casters N permit the carrier, when separated from the shells B, to be wheeled to a storage area with a minimum of physical effort. Electrical energy is supplied to the tail lights O through electrical conductors P that are connected to the electrical system of the vehicle D by means not shown.

Each of the shells B has two diametrically aligned openings 38 formed therein which may be engaged by a pin 40 having a head 42 thereon. The end of pin 40 opposite that on which head 42 is mounted has a transverse bore 44 formed therein through which a key 46 can be inserted to hold the pin in a transverse position on one of the shells B. Each member A has a number of paired longitudinally spaced openings 48 formed therein, with the paired openings on one member being in transverse alignment with corresponding openings on the other member.

The openings 48 are engaged by the pins 40, and the selection of two pairs of these openings determines the spacing of the angle irons F and G and the motorcycle J supported thereon rearwardly of the vehicle D. The brackets C, as can best be seen in FIGURE 2, are inverted U-shaped members, with the upper ends of the two downwardly extending legs thereof being connected by a web 52. Stud bolts 54 project upwardly from the web 52, and are adapted to extend through openings (not shown) in the chassis (not shown) of the vehicle D and secured to the chassis by nuts 55 which engage the stud bolts.

The angle iron F is preferably rigidly affixed to the members A by welding, or the like. Angle iron G can be affixed either by welding to he members A, or by providing two openings therein through which a bolt 56 extends downwardly to engage one of a number of vertically aligned bores 58 formed in each of the members A. By selectively engaging the bores 58, a desired spacing can be attained between the vertical flanges 59 and 60 of the angle irons F and G respectively, to accommodate the width of a particular wheel H of a motorcycle J. Bolts 56 are removably held in position as shown in FIGURE 2, by nuts 62 which engage the same.

The lower ends of the yoke L are preferably welded to the interior faces of the flanges 59 and 60. Yoke L is formed from a resilient strap iron or like material and can be deformed either forwardly or rearwardly to permit a desired spacing between the flanges 59 and 60 to accommodate the particular width of tire on the wheels H.

Operation of the invention is relatively simple. The shells B are mounted on the chassis (not shown) of the automotive vehicle D as previously explained in detail, and the members A then inserted therein to place the angle irons F and G a desired distance rearwardly of the vehicle. Thereafter the bumper M is removed from the carrier and disposed as shown in FIGURE 3 whereby the recesses 30 are in engagement with the prongs 28. Bumper M may then be used as a ramp on which the motorcycle J can be wheeled into the supported position shown in FIGURE 1. The motorcycle J is then firmly secured to the carrier by means of the ties or chains K and the bumper M replaced in the position shown in FIGURE 1 with the bolts 24 inserted through openings 26 and engaged by nuts 27. The vehicle D may then be used to transport the motorcycle J to the desired destination where the above described operation is reversed, with the bumper again serving as a ramp to permit the easy removal of motorcycle J.

To lend strength to the yoke L, two reinforcing members 64 are welded to the side portions thereof and extend to the flanges 59 and 60 to which they are affixed by conventional means.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. A carrier for a two-wheeled pneumatic-tired vehicle which is adapted to be supported from the rear of the chassis of an automotive vehicle, including:
   (a) two parallel, laterally spaced, rigid members;
   (b) means for so supporting said members from said chassis that portions of said members extend rearwardly therebehind in longitudinal relationship therewith;
   (c) first and second transversely positioned angle irons that rest on the upper surfaces of said members and are affixed thereto, with the forward and rear interior surfaces of said angle irons being spaced apart a slightly greater distance than the width of one of the tires on said two-wheeled vehicle;
   (d) a yoke that extends upwardly from first end portions of said angle irons for removably engaging a wheel of said two-wheeled vehicle to maintain the same in an upright position on said angle irons;
   (e) means for removably securing said two-wheeled vehicle in a supported position on said angle irons;
   (f) a rigid bumper comprising an elongate web and two flanges which extend outwardly from the longitudinal sides thereof;
   (g) means for removably supporting said bumper from the rear portions of said members; and
   (h) means for removably holding a first end portion of said bumper in communication with the space between said angle irons when a second end portion of said bumper rests on the ground to provide a ramp on which said two-wheeled vehicle may be wheeled onto said angle irons or wheeled downwardly therefrom.

2. A carrier as defined in claim 1 wherein said means for supporting said members includes:
   (a) two rigid, laterally spaced bodies, each of which have at least one longitudinally extending surface that slidably engages one of said members;
   (b) means for affixing said bodies to said chassis; and
   (c) means for selectively holding said members at any one of a plurality of positions relative to said bodies to dispose said angle irons and two-wheeled vehicle supported thereon at a desired spacing rearwardly of said automobile.

3. A carrier as defined in claim 1 wherein said members comprise pipes and said means for supporting said pipes include:
   (a) two elongate cylindrical shells that are slidably engaged by the forward end portions of said pipes, with each of said shells having two diametrically aligned openings formed therein;
   (b) bracket means for removably affixing said shells to said chassis; and
   (c) two pins that can be extended through said openings to engage any one of a plurality of pairs of longitudinally spaced bores in said pipes to dispose said angle irons and two-wheeled vehicle supported thereon a desired spacing rearwardly of said automobile.

4. A carrier as defined in claim 1 wherein said means for removably supporting said bumper comprise two bolts that extend upwardly from the rear extremities of said members and project through openings in said members, and two nuts which engage said bolts to prevent inadvertent displacement of said bumper from said members.

5. A carrier as defined in claim 1 wherein said means for removably holding a first end portion of said bumper in communication with the space between said angle irons comprises at least one prong that extends upwardly from a horizontal portion of one of said angle irons to engage an opening in an end portion of said bumper.

No references cited.

HUGO O. SCHULZ, *Primary Examiner.*